United States Patent [19]

Koga et al.

[11] Patent Number: 5,567,515

[45] Date of Patent: Oct. 22, 1996

[54] SURFACE PROTECTIVE FILMS

[75] Inventors: Hitoshi Koga; Masao Kameyama; Kazuo Iwata; Masahiro Gonda, all of Yamaguchi, Japan

[73] Assignee: Mitsui Petrochemical Industries, Ltd., Tokyo, Japan

[21] Appl. No.: 365,540

[22] Filed: Dec. 28, 1994

[30] Foreign Application Priority Data

Dec. 28, 1993 [JP] Japan ................... 5-336419

[51] Int. Cl.$^6$ ............... B32B 7/12; B32B 27/08
[52] U.S. Cl. ................ 428/355; 428/354; 428/516
[58] Field of Search ................. 428/516, 355, 428/354, 343

[56] References Cited

U.S. PATENT DOCUMENTS

| | | | |
|---|---|---|---|
| 3,542,717 | 11/1970 | Lipman | 260/27 |
| 5,017,429 | 5/1991 | Akao | 428/355 X |
| 5,194,318 | 3/1993 | Migliorini et al. | 428/516 X |
| 5,209,971 | 5/1993 | Babu et al. | 428/355 X |
| 5,232,776 | 8/1993 | Lu et al. | 428/516 X |
| 5,318,824 | 6/1994 | Itaya et al. | 428/516 |
| 5,364,704 | 11/1994 | Murschall et al. | 428/516 |
| 5,366,796 | 11/1994 | Murschall et al. | 428/516 X |
| 5,376,437 | 12/1994 | Kawakami et al. | 428/516 X |
| 5,445,883 | 8/1995 | Kobayashi et al. | 428/516 X |

*Primary Examiner*—Daniel Zirker
*Attorney, Agent, or Firm*—Birch, Stewart, Kolasch & Birch, LLP

[57] ABSTRACT

The underside of a base layer consisting of one or more sub-layers is overlaid with an adhesive layer that is chiefly composed of an α-olefin copolymer that is based on at least two α-olefins selected from among α-olefins having 2–12 carbon atoms and which has a crystallinity of up to 10%, and said adhesive layer will develop an initial tack of at least 20 g/25 mm when attached to the surface of a stainless steel plate at 23° C. The thus produced surface protective film, when attached to various kinds of adherends, will not experience separation of the adhesive layer from the base layer while developing strong initial tack, will experience only small changes in adhesive strength (peel strength) with the lapse of time after attachment to the adherends, is sufficiently low in blocking force to provide ease in film handling during the rewinding operation and it yet can be manufactured at low cost.

17 Claims, No Drawings

SURFACE PROTECTIVE FILMS

BACKGROUND OF THE INVENTION

1. Field of the Invention

This invention relates to surface protective films and, more particularly, to surface protective films that develop strong initial tack at room temperature, that will experience limited changes in adhesive strength with the lapse of time after film attachment and that are sufficiently low in blocking force to provide great ease in the handling or films being rewound.

2. Description of the Related Arts

Metal plates such as aluminum, steel and stainless steel plates, coated metal plates of the same species, and other workpieces such as glass and synthetic resin plates may potentially experience the corrosion, dust deposition or damage problem during transport or storage. With a view to preventing these problems, the surfaces of the workpieces are covered with protective films. The applied surface protective films are stripped from the workpieces at a suitable time either during or after the shaping operation.

There are basic needs that must be met by the surface protective films: they must develop sufficiently strong initial tack to permit easy bonding to the adherend; they should not easily separate from the adherend during its transport or storage; they must be readily stripped from the adherend as required either during or after the working operation. To this end, the surface protective films must satisfy the following requirements: they should have an appropriate degree of adhesiveness to the surface of the adherend to be protected; the films should be soft enough to avoid damaging of the surface to be protected; they should have resistance to corrosion and oils such as machine oils; these properties of the protective films should not change with time or temperature; the films should have mechanical characteristics such as elongation characteristic, scratch resistance, tear resistance, ease in cutting and blanking operations that are appropriate for various methods of working or shaping the adherend; and the films should have high heat resistance. For use in certain applications, the films are required to have satisfactory appearance, transparency and colors in the absence of any film defects such as gelation and fish eyes.

Finally, the surface protective films of the kind contemplated herein which are consumed in large volumes and which are discarded within short life cycles must be produced at an economically feasible low cost. Conventionally, such surface protective films are in most cases produced by coating an acrylic or rubber-based adhesive onto one surface of base films that are chiefly composed of polymers such as low-density polyethylene, polyvinyl chloride and polypropylene. Surface protective films of a dual structure that are produced by co-extrusion of polyethylene and a vinyl acetate resin find use in certain areas and they comprise a polyethylene base layer and a self-adhesive layer made of the vinyl acetate resin.

Further, the surface protective films bonded to the adherend are often processed by cutting, bending, drawing, etc. In order to prevent separation from the adherend during processing, it is common practice to form an adhesive layer of an adhesive that is so formulated as to develop strong initial tack. However, a surface protective film that has an adhesive coated on one surface of the base layer to form an adhesive layer has a problem with the adhesion between the base layer and the adhesive layer and suffers a defect in quality in that the adhesive cannot be completely stripped from the base layer in a later stage and there is a high likelihood for a portion of the adhesive to be left on the base layer. As a further problem, such protective films are more costly than films that have no adhesive layers since their production involves the preparation of a film or the base layer, applying a surface treatment to that base film, coating an adhesive composition that is dissolved in a solvent and then drying the solvent.

The conventional surface protective film that is produced by co-extrusion of two layers has problems. The problem that is worth particular mention is that the carboxylate groups in the vinyl acetate units that compose the self-adhesive layer have bonding property, causing great changes in adhesive strength with the lapse of time; therefore, such surface protective films are only applicable to limited types of resin plates and have a restriction on the field of application. Further, the surface protective film is offered in close winding in the length of several hundreds to several thousands. If the adhesive layer is formed of an adhesive formulation that will develop strong initial tack, the force of blocking between the adhesive layer and the base layer increases so much that the film rewinding operation on bonding to the adherend becomes difficult enough to reduce the ease in handling procedures for bonding.

SUMMARY OF THE INVENTION

An object, therefore, of the invention is to provide a surface protective film that, when attached to various kinds of adherends, will not experience separation of an adhesive layer from a base layer while developing strong initial tack, that will experience only small changes in adhesive strength (peel strength) with the lapse of time after attachment to the adherends, that is sufficiently low in blocking force to provide ease in film handling during the rewinding operation and that yet can be manufactured at low cost.

This object of the invention can be attained by a surface protective film that has a base layer and an adhesive layer that is disposed on the underside of said base layer, characterized in that said base layer consists of one or more sub-layers and that said adhesive layer is chiefly composed of an α-olefin copolymer that is based on at least two α-olefins selected from among α-olefins having 2–12 carbon atoms and which has a crystallinity of up to 10%, further characterized in that said adhesive layer develops an initial tack of at least 20 g/25 mm when said film is attached to the surface of a stainless steel plate at 23° C.

In its first aspect, the invention provides a surface protective film that has a base layer and an adhesive layer that is disposed on the underside of said base layer, characterized in that said base layer consists of one or more sub-layers, that the sub-layer in contact with the adhesive layer is chiefly composed of a polymer containing an α-olefin having 2–12 carbon atoms, that said adhesive layer is chiefly composed of an α-olefin copolymer that is based on at least two α-olefins selected from among α-olefins having 2–12 carbon atoms and which has a crystallinity of up to 10% further characterized in that said adhesive layer develops an initial tack of at least 20 g/25 mm when said film is attached to the surface of a stainless steel plate at 23° C.

In its second aspect, the invention provides a surface protective film that has a base layer and an adhesive layer that is disposed on the underside of said base layer, characterized in that said base layer consists of one or more sub-layers and that said adhesive layer is chiefly composed of an α-olefin that is based on at least two α-olefins selected from among α-olefins having 2–12 carbon atoms and which has a crystallinity of up to 10% further characterized in that said adhesive layer develops an initial tack of at least 20 g/25 mm when said film is attached to the surface of a stainless steel plate at 23° C. and that said adhesive layer exhibits an adhesive strength of no more than 1000 g/25 mm after the lapse of time under heating at pressure.

DETAILED DESCRIPTION OF THE INVENTION

The surface protective film of the invention (which is hereunder referred to as "the film of the invention") will now be described in detail.

The film of the invention is a multilayered film that contains at least two layers including a base layer and an adhesive layer that is disposed on the underside of said base layer.

The base layer of the film of the invention consists of one or more sub-layers. The base layer may be chiefly composed of α-olefin polymers or modified products thereof, copolymers of α-olefins with vinyl compounds such as vinyl acetate and methacrylates, as well as polyamides, polyesters, polycarbonates, polyurethanes, etc. If the base layer consists of two or more sub-layers, adjacent sub-layers may be composed of any materials that can form a strong bond by melt co-extrusion. In this particular case, the respective sub-layers may be adapted to exhibit the various characteristics that are required of the surface protective film. For example, intermediate sub-layers may be responsible for exhibiting satisfactory elongational characteristic or tear resistance during working or a weathering stabilizer may be added to make them weatherproof, whereas the outermost sub-layer may be rendered to provide for protection against surface flaws or given sufficient releasability from the adhesive layer to assure easy rewinding of the protective film. Thus, the base layer is preferably composed of two or more sub-layers that can individually be assigned various roles.

If the base layer of the film of the invention consists of two or more sub-layers, is preferred that the sub-layer in contact with the adhesive layer is chiefly composed of a polymer containing an α-olefin having 2–12 carbon atoms. The composition of said sub-layer is not limited in any particular way as long as it is chiefly composed of a polymer containing an α-olefin having 2–12 carbon atoms while being capable of forming a strong bond with the adhesive layer. The polymer containing an α-olefin having 2–12 carbon atoms may be exemplified by homo- or copolymers of α-olefins such as ethylene, propylene and butene-1 and more specific examples include those polymers which are based on homopolymers such as various kinds of polyethylene, polypropylene and polybutene, or α-olefinic copolymers thereof. These α-olefin containing polymers may be contained either individually or in combination in the sub-layer that is in contact with the adhesive layer. The sub-layer in contact with the adhesive layer may also contain auxiliary resin components that incorporate radicals such as oxygen-containing groups other than hydrocarbons in the polymer matrix on the condition that they will not bleed out to adversely affect the adhesive layer. The content of the α-olefin containing polymer in the sub-layer in contact with the adhesive layer is typically about 50–100 wt %, preferably about 70–100 wt %.

The content of the α-olefin containing polymer in the outermost sub-layer of the base layer is typically about 50–100 wt %, preferably about 70–100 wt %. Further, it is preferred in view of low blocking force during the rewinding operation that the outermost sub-layer is a layer chiefly composing of a mixture containing not only the α-olefin containing polymer but also a metal ionically crosslinked resin of an ethylene-(meth)acrylic acid copolymer.

The metal ionically crosslinked resin of an ethylene(meth) acrylic acid copolymer is generally referred to as an "ionomer" resin that is composed of an ionic polymer in which metal ions such as Zn or Na ions are pendant to the molecular chain of an ethylene-(meth)acrylic acid copolymer. A specific example of the metal ionically crosslinked resin of an ethylene-(meth)acrylic acid copolymer is commercially available from Mitsui-Du Pont Polychemical Co., Ltd. under the trade name "HIMILAN".

If the outermost sub-layer in the base layer of the film of the invention is chiefly composed of a mixture containing not only the α-olefin containing polymer but also the metal ionically crosslinked resin of an ethylene-(meth)acrylic acid copolymer, the relative proportions of (the α-olefin containing polymer)/(the metal ionically crosslinked resin) is typically about 95/5–5/95, preferably 90/10–50/50 by weight ratio. The content of the mixture containing the two components in the outermost layer of the base layer is typically about 50–100 wt %.

The base layer may also contain various additives that are customarily used in the base layer of surface protective films of the type contemplated by the invention. Exemplary additives that may be contained include various kinds of fillers, pigments, uv absorbers, antioxidants, heat stabilizers, lubricants, etc.

The base layer of the film of the invention is about 10–200 μm thick, the preferred range being about 30–150 μm from the viewpoints of protection against flaws, efficiency in the operation of film attachment and the price of the film.

The adhesive layer in the film of the invention which is disposed on the underside of the base layer is chiefly composed of a copolymer that is based on at least two α-olefins selected from among α-olefins having 2–12 carbon atoms. Such α-olefin based copolymers may be used either individually or in admixture. Exemplary α-olefins having 2–12 carbon atoms include ethylene, propylene, 1-butene, 1-pentene, 3-methyl-1-butene, 1-hexene, 4-methyl-1-pentene, 3-methyl-1-pentene, 1-heptene, 1-octene, 1-decene, 1-dodecene, etc. If the adhesive layer is chiefly composed of the copolymer, the copolymer content is typically at least 30 wt %, preferably at least 50 wt %, of the adhesive layer.

In a preferred embodiment, the adhesive layer is chiefly composed of a ternary copolymer consisting of propylene, 1-butene and an α-olefin having 5–12 carbon atoms. The case where the adhesive layer is chiefly composed of a copolymer consisting of 10–85 mol % propylene, 3–60 mol % 1-butene and 10–85 mol % of an α-olefin having 5–12 carbon atoms is particularly preferred since it exhibits excellent adhesion characteristics at ordinary room temperatures. More preferably, the adhesive layer may chiefly be composed of a copolymer containing 15–70 mol % propylene, 5–50 mol % 1-butene and 15–70 mol % of an α-olefin having 5–12 carbon atoms. If the adhesive layer is chiefly composed of the ternary copolymer consisting of propylene, 1-butene and an α-olefin having 5–12 carbon atoms, the copolymer content is typically at least 30 wt %, preferably at least 50 wt %, of the adhesive layer.

In order to improve its adhesion performance, the adhesive layer may contain not only the ternary copolymer consisting of propylene, 1-butene and an α-olefin having 5–12 carbon atoms but also another α-olefinic copolymer. In this case, the total content of the ternary copolymer and the α-olefinic copolymer is preferably at least 50 wt % of the adhesive layer.

The additional α-olefinic copolymer which may be incorporated in the adhesive layer is at least one member selected from among:

(A) a copolymer of at least two monomers selected from among ethylene, propylene and 1-butene;

(B) a cooligomer of ethylene and an α-olefin; and (C) a styrene-diene based copolymer or those hydrogenated. Such additional α-olefinic copolymers may be used either individually or in combination. Further, among the sub-component which may be incorporated with the main component consisting of α-olefin copolymer, the styrene-dien based copolymer or those hydrogenated is particularly preferred. Specific examples of the styrene-diene based copolymer or those hydrogenated are;

(D) a styrene-ethylene-butylene-styrene block copolymer;

(E) a styrene-isoprene-styrene block copolymer. Such copolymers may be used either individually or in combination.

Specific examples of copolymer (A) which consists of at least two monomers selected from among ethylene, propylene and 1-butene include an ethylene-propylene copolymer, an ethylene-1-butene copolymer, a propylene-1-butene copolymer, etc. More specific examples of copolymer (A) include those which are commercially available from Mitsui Petrochemical Industries, Ltd. under various trade names such as TAFMER P, TAFMER S, TAFMER A, TAFMER XR, etc.

The cooligomer (B) of ethylene and an α-olefin is a low-molecular weight copolymer of ethylene and an α-olefin that is liquid at room temperature. Exemplary α-olefins are those having 3–20 carbon atoms which include propylene, 1-butene, 1-pentene, 1-hexene, 1-octene, 1-decene, 1-dodecene, 1-tetradecene, 1-hexadecene, 1-octadecene, 4-methyl-1-pentene, etc. Among these, α-olefins having 3–14 carbon atoms are preferred.

The cooligomer (B) has structural units represented by the following formula (b):

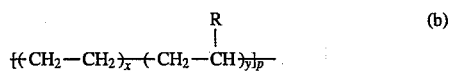

where R is a group represented by $C_nH_{2n+1}$ (n is a positive integer), and x, y and p are each a positive integer.

Cooligomer (B) has typically a number average molecular weight in the range 100–10,000, preferably 200–5,000. The ethylene content in this cooligomer (B) is typically 30–70 mol %, preferably 40–60 mol %.

If cooligomer (B) is to be used as the additional olefinic copolymer in the adhesive layer in the film of the invention, its relative proportion is typically 0–20 wt %, preferably 0–10 wt %.

The styrene-ethylene-butylene-styrene block copolymer (D) (which is hereunder abbreviated as "SEBS") is the hydrogenation product of a styrene-butadiene-styrene block copolymer and it contains styrenic polymer blocks in an amount of about 12,000–100,000 as calculated for number average molecular weight, and ethylene-butylene polymer blocks in an amount of about 10,000–300,000 as calculated for number average molecular weight. The relative proportions of the styrene polymer blocks to the ethylene-butylene polymer blocks in the SEBS (D) range typically from 5:95 to 50:50, preferably from 10:90 to 30:70.

A specific example of SEBS (D) is commercially available from Shell Chemical Co. under the trade name "CLAYTON G".

If the SEBS (D) is to be used as the sub-component in the adhesive layer in the film of the invention, its relative proportion is typically 0–50 wt %, preferably 0–45 wt %.

The styrene-isoprene-styrene block copolymer (E) (which is hereunder abbreviated as "SIS") is a block copolymer containing styrene polymer blocks and isoprene polymer blocks, with the former content being about 12,000–100,000 as calculated for number average molecular weight and the latter content being about 10,000–300,000 as calculated for number average molecular weight. The relative proportions of the styrene polymer blocks to the isoprene polymer blocks in the SIS (E) range typically from 5:95 to 50:50, preferably from 10:90 to 30:70.

A specific example of SIS (E) is commercially available from Shell Chemical Co. under the trade name "CLAYTON D".

If the SIS (E) is to be used as the sub-component in the adhesive layer in the film of the invention, its relative proportion is typically 0–50 wt %, preferably 0–30 wt %. However, if the SEBS(D) and SIS(E) is to be used simultaneously as the sub-component, its relative total portion in the adhesive layer of (D) and (E) is preferably up to 45 wt %.

Using a mixed resin consisting of the basic α-olefinic copolymer and the additional copolymer (A) as the chief component of the adhesive layer is advantageous for the following reasons: the glass transition temperature of the adhesive layer is lowered; the initial tack that develops can be adjusted to an appropriate range; and the low-temperature adhesion characteristics are improved. Using a mixed resin consisting of the basic α-olefinic copolymer and the additional cooligomer (B) as the chief component of the adhesive layer is also advantageous for the following reasons: the glass transition temperature of the adhesive layer is lowered; the initial tack that develops can be adjusted to an appropriate range; and the viscosity that develops can also be adjusted to an appropriate range. Using a mixed resin consisting of the basic α-olefinic copolymer and the additional SEBS (D) and/or SIS (E) is also advantageous for the reasons as set forth above in connection with the use of copolymer (A) in addition to the basic α-olefinic copolymer.

The adhesive layer in the film of the invention may further contain various auxiliary components in addition to the basic α-olefinic copolymer, the optional α-olefinic copolymer and styrene-dien based copolymer exemplified as the particularly preferred sub-component. Examples of such auxiliary components include thermoplastic elastomers typified by resins such as copolymers of α-olefins and various vinyl containing compounds and graft modified products of the copolymers, plasticizers such as liquid butyl rubber, and tackifiers such as polyterpene. Auxiliary components that have adhesive radicals and unsaturated bonds are preferably adjusted in type, content, etc. in order to assure that there will be no changes in adhesive strength with the lapse of time after film attachment under exposure to various weathering conditions such as heat, pressure, moisture and uv light.

The adhesive layer in the film of the invention may also contain various additives that are customarily incorporated in the compounding formulation for the adhesive layer of the type contemplated by the invention. Exemplary additives that may be contained include various fillers, pigments, uv absorbers, antioxidants, heat stabilizers, lubricants, etc.

The adhesive layer in the film of the invention is chiefly composed of an α-olefin copolymer that is based on at least two α-olefins selected from among α-olefins having 2–12 carbon atoms and the crystallinity of the α-olefin copolymer should not exceed 10% as measured by X-ray diffraction. To develop satisfactorily strong initial tack, the crystallinity of the α-olefin polymer is preferably not more than 5%.

The adhesive layer in the film of the invention should develop an initial tack of at least 20 g/25 mm when the film is attached to the surface of a stainless steel plate at 23° C. Preferably, the adhesive layer is such that even after pressurization at 2 kg/cm$^2$ and heating at 60° C. for 10 days, the film can be stripped with a force of no more than 1 kg/25 mm without breakage or without any portion of the adhesive being left on the surface of a stainless steel plate.

The thickness of the adhesive layer in the film of the invention is typically about 1–100 μm. The preferred thickness of the adhesive layer is from about 3 to 50 μm since this provides ease in controlling the film layer arrangement when the film of the invention is to be produced by co-extrusion and because a surface protective film having satisfactory mechanical strength can be manufactured.

The overall thickness of the film of the invention is typically about 10–300 μm, preferably about 30–200 μm.

The film of the invention may be produced by any known methods that are capable of fabricating a multilayered film containing at least the base layer and the adhesive layer. A particularly preferred method is one that comprises the steps of heating to the molten state two or more formulations for the base layer (consisting of a surface layer and an intermediate layer) and the adhesive layer, and co-extruding the respective melts to form a three-layered film having a desired thickness. This method is preferred since it is efficient and capable of producing the film of the invention at low cost. Another method that can be adopted is to laminate the adhesive layer over the base layer by melt extrusion.

SPECIFIC EXAMPLES OF THE INVENTION

The following examples and comparative examples are provided for the purpose of further illustrating the invention but are in no way to be taken as limiting the scope of the invention.

Examples 1–4

In Examples 1–4, three-layered surface protective films 50 μm thick were prepared by co-extrusion through a T die under the molding conditions specified below. Each protective film comprised a surface forming base layer 10 μm thick which was composed of a propylene homopolymer, an intermediate base layer 30 μm thick which was composed of a propylene random polymer with 3 mol % ethylene, and an adhesive layer 10 μm thick which was composed of propylene, 1-butene and 4-methyl-1-pentene (their relative proportions are indicated in Table 1 in terms of mol %).

| Melting temperature: | | |
|---|---|---|
| surface forming base layer | = | 230° C. |
| intermediate base layer | = | 230° C. |
| adhesive layer | = | 180° C. |
| Co-extrusion temperature: | | 230° C. |

The crystallinity of the α-olefin based or copolymers that composed the adhesive layer of each film sample was measured by X-ray diffraction (according to S,L.AGGARWAL:J.Polymer Sci. 18,17, 1955) and the results are shown in Table 1. The initial tack of each film sample, the time-dependent change in adhesive strength which it experienced and the residual adhesive which remained after film stripping were measured or evaluated by the methods described below. The results are also shown in Table 1.

Initial tack measurement

Initial tack of each film sample was measured in accordance with JIS Z0237 (1991), except that the polishing of stainless steel SUS 304 with abrasive paper was omitted from the surface-finishing procedure, so that its surface remained in the state BA specified in JIS G4305. The peel strength as measured by a 180° peel method was used as an index of adhesive strength.

Time-dependent change under heating at pressure

As in the case of initial tack measurement, test pieces were prepared by attaching each film sample to stainless steel SUS 304. The film sample was overlaid with a clean, crease-free aluminum foil 15 μm thick which, in turn, was overlaid with a silicone rubber sheet as specified in JIS K6301 that had a spring hardness of 70 Hs and a thickness of 3 mm. The test pieces were held for 240 h, with a uniform pressure of 2 kg/cm$^2$ being applied to the film attached area by means of a heated (60° C.) press. The test pieces were then removed from the press and the peel strength as measured within 2–5 h by a 180° peel method was used as an index of adhesive strength.

Residual adhesive

The surface of each stainless steel test piece that had been subjected to the peel test was examined visually and the result was rated as "positive" when part of the adhesive layer on a film sample separated definitely by a diameter of 1 mm or more so that the adhesive layer remained partly stuck to the surface of the stainless steel test piece.

Example 5

A three-layered surface protective film 50 μm thick was prepared by co-extrusion through a T die under the molding conditions specified below. The protective film comprised a surface forming base layer 10 μm thick which was composed of high-density (0.953 g/cm$^3$) polyethylene, an intermediate base layer 30 μm thick which was composed of medium-density (0,940 g/cm$^3$) polyethylene and an adhesive layer 10 μm thick which was composed of a mixture of 70 parts by weight of propylene/1-butene/4-methyl-1-pentene copolymer that was used in Example 1 and 30 parts by weight of a copolymer consisting of 80 mol % ethylene and 20 mol % propylene. The initial tack of the film sample, the time-dependent change in adhesive strength which it experienced and the residual adhesive which remained after film stripping were measured or evaluated as in Example 1. The results are shown in Table 1.

Molding conditions

| Melting temperature: | | |
|---|---|---|
| surface forming base layer | = | 230° C. |
| intermediate base layer | = | 230° C. |
| adhesive layer | = | 180° C. |
| Co-extrusion temperature: | | 230° C. |

Example 6

A surface protective film was prepared as in Example 5, except that the adhesive layer was formed of a mixture consisting of 50 parts by weight of a propylene/1-butene/4-methyl-1-pentene copolymer, 20 parts by weight of an ethylene-propylene copolymer, 20 parts by weight of SEBS (G-1657 of Shell Chemical Co.) and 10 parts by weight of SIS (SIS 5000 of Japan Synthetic Rubber Co., Ltd.) The average crystallinity, the initial tack, the time-dependent change in adhesive strength and the residual adhesives were measured or evaluated as in Example 1. The results are shown in Table 1.

Comparative Example 1

A surface protective film was prepared as in Example 5, except that the adhesive layer was formed solely of a ethylene-propylene copolymer. The results of performance measurement or evaluation of the film were as follows; the adhesive layer had an crystallinity of 5% developed an initial tack of 200 g/25 mm and exhibited an adhesive strength of 1300 g/25 mm after exposure to heat under pressure, which was too high to permit smooth stripping of the film.

Comparative Example 2

A surface protective film was prepared as in Example 5, except that the adhesive layer was formed solely of a copolymer consisting of 90 mol % ethylene and 10 mol % 1-butene. The results of performance measurement or evaluation of the film were as follows: the adhesive layer had an crystallinity of 15% and developed an initial tack of 15 g/25 mm. Because of the low initial tack, the film was not amenable to various kinds of working.

Comparative Example 3

A surface protective film was prepared as in Example 5, except that the adhesive layer was solely composed of a copolymer consisting of 70 mol % propylene and 30 mol % 1-butene. The results of performance measurement or evaluation of the film were as follows: the adhesive layer had an crystallinity of 50% and developed an initial tack of 10 g/25 mm. Because of the low initial tack, the film was not amenable to various kinds of working.

Comparative Example 4

A surface protective film was prepared as in Example 5, except that the adhesive was solely composed of a copolymer consisting of 70 mol % propylene and 30 mol % 4-methyl-1-pentene. The results of performance measurement or evaluation of the film were as follows: the adhesive layer had an crystallinity of 25% and developed an initial tack of 5 g/25 mm. Because of the low initial tack, the film was not amenable to various kinds of working.

TABLE 1

|  | Unit or criterion | Ex. 1 | Ex. 2 | Ex. 3 | Ex. 4 | Ex. 5 | |
|---|---|---|---|---|---|---|---|
| Component of adhesive layer | | | | | | | |
| α-olefinic copolymer | | | | | | | |
| ethylene | mol % | | | | | | 80 |
| propylene | mol % | 50 | 60 | 30 | 20 | 50 | 20 |
| 1-butene | mol % | 20 | 20 | 30 | 60 | 20 | |
| 4-methylene-1-pentene | mol % | 30 | 20 | 40 | 20 | 30 | |
| crystallinity | % | 2 | 5 | 6 | 7 | 2 | 5 |
| intrinsic viscosity | dl/g | 1.6 | 2.5 | 2.2 | 0.9 | 1.6 | 1.9 |
| Other copolymers | | | | | | | |
| SEBS | | — | — | — | — | — | — |
| SIS | | — | — | — | — | — | — |
| Proportions in adhesive layer | wt % | 100 | 100 | 100 | 100 | 70 | 30 |
| Adhesive characteristics | | | | | | | |
| initial tack | g/25 mm | 80 | 60 | 30 | 130 | 150 | |
| adhesive strength after heating at pressure | g/25 mm | 600 | 500 | 450 | 800 | 750 | |
| residual adhesive after heating at pressure | positive/negative | negative | negative | negative | negative | negative | |

|  | Ex. 6 | Comp. Ex. 1 | Comp. Ex. 2 | Comp. Ex. 3 | Comp. Ex. 4 |
|---|---|---|---|---|---|
| Component of adhesive layer | | | | | |
| α-olefinic copolymer | | | | | |
| ethylene | | 80 | 80 | 90 | |
| propylene | 50 20 | | 20 | | 70 | 70 |
| 1-butene | 20 | | | 10 | 30 | |
| 4-methylene-1-pentene | 30 | | | | | 30 |
| crystallinity | 2 5 | 5 | 15 | 50 | 25 |
| intrinsic viscosity | 1.6 1.9 | 1.9 | 1.7 | 1.6 | 1.2 |
| Other copolymers | | | | | |

TABLE 1-continued

| | | | | | | | | |
|---|---|---|---|---|---|---|---|---|
| SEBS | | | 100 | | — | — | — | — |
| SIS | | | | 100 | — | — | — | — |
| Proportions in adhesive layer | 50 | 20 | 20 | 10 | 100 | 100 | 100 | 100 |
| Adhesive characteristics | | | | | | | | |
| initial tack | | | 200 | | 200 | 15 | 10 | 5 |
| adhesive strength after heating at pressure | | | 900 | | 1300 | — | — | — |
| residual adhesive after heating at pressure | | | negative | | impossible to strip | — | — | — |

Notes:
Crystallinity refers to the crystallinity of the indicated α-olefinic copolymer. Intrinsic viscosity was measured in decalin at 135° C..

Example 7

A three-layered surface protective film was prepared by co-extrusion through a T die as in Example 1. The protective film comprised a surface forming base layer 10 μm thick which was composed of 80 parts by weight of high-density (0.98 g/cm³) polyethylene and 20 parts by weight of low-density (0.92 g/cm³) polyethylene, an intermediate base layer 39–40 μm thick which was composed of 60 parts by weight of an ethylene/4-methyl-1-pentene random copolymer (MI: 2.1 g/10 min; density, 0.92 g/cm³;m.p. 120° C.; ethylene content, 91 wt %), 40 parts by weight of an ethylene-vinyl acetate copolymer, and 0.9 parts by weight of a uv absorber (TINUVIN 326 of Ciba-Geigy A.G.), and an adhesive layer 10–12 μm thick which was composed of a mixture comprising 65 parts by weight of an α-olefinic copolymer consisting of 50 mol % propylene, 20 mol % 1-butene and 30 mol % 4-methyl-1-pentene, 20 parts by weight of SEBS, 10 parts by weight of SIS and 5 parts by weight of an ethylene-α-olefin cooligomer (LUCANT HC-20 of Mitsui Petrochemical Industries, Ltd.) The average crystallinity, the initial tack, the time-dependent change in adhesive strength and residual adhesives were measured or evaluated. Further, the rewinding force was measured according to the following method. The results are shown in Table 2.

Method of measuring the rewinding force

A film sample 30 cm wide in a thermostatic chamber (23° C.) was fitted with a spring balance at the leading edge and the film was unwound at a speed of 5 m/min; the reading of the balance provided a basis for determining the film rewinding force.

Example 8

A surface protective film was prepared as in Example 7, except that the adhesive layer was formed of a mixture of 45 parts by weight of a copolymer consisting of 50 mol % propylene, 20 mol % 1-butene and 30 mol % 4-methyl-1-pentene, 15 parts by weight of an ethylene-propylene copolymer (80 mol % ethylene and 20 mol % propylene; MI, 1.0 g/10 min; density 0.87 g/cm³). 30 parts by weight of SEBS, 10 parts by weight of SIS, and 5 parts of an ethylene-α-olefin cooligomer (LUCANT HC-20 of Mitsui Petrochemical Industries, Ltd.) The average crystallinity, the initial tack, the time-dependent change in adhesive strength, residual adhesives and rewinding force were measured or evaluated. The results are shown in Table 2.

Examples 9

Three-layered surface protective films were prepared by co-extrusion through a T die as in Example 1. Each protective film comprised a surface forming base layer 10 μm thick which was composed of 70 parts by weight of high-density (0.95 g/cm³) polyethylene and 30 parts by weight of a sodium ionically crosslinked resin of an ethylene-(meth)acrylic acid copolymer (HIMILAN 1605 of Mitsui Petrochemical Industries, Ltd.), an intermediate base layer 40 μm thick which was composed of 60 parts by weight of an ethylene/4-methyl-1-pentene random copolymer (ethylene content, 91 wt %; MI, 2.1 g/10 min; density, 0.92 g/cm³; m.p. 120° C.) and 40 parts by weight of an ethylene-vinyl acetate copolymer, and an adhesive layer 10 μm thick which was composed of 50 parts by weight of a propylene/1-butene/4-methyl-1-pentene copolymer (50 mol % propylene; 20 mol % 1-butene; 30 mol % 4-methyl-1-pentene), 10 parts by weight of an ethylene-propylene copolymer (80 mol % ethylene and 20 mol % propylene; MI, 1.0 g/10 min; density, 0.87 g/cm³), 25 parts by weight of SEBS, 10 parts by weight of SIS, and 5 parts by weight of an ethylene-α-olefin cooligomer (LUCANT HC-20 of Mitsui Petrochemical Industries, Ltd.) The ease of film making, the rewinding force, its initial tack, the adhesive strength it exhibited after exposure to heat under pressure and residual adhesives were measured or evaluated. The results are shown in Table 2.

Example 10

A surface protective film was prepared as in Example 9 except that the surface forming base layer 10 μm thick was composed of 50 parts by weight of high-density (0.95 g/cm³) polyethylene and 50 parts by weight of a sodium ionically crosslinked resin of an ethylene-(meth)acrylic acid copolymer (HIMILAN 1605 of Mitsui Petrochemical Industries, Ltd.) The ease of film making, the film rewinding force, the initial tack of the film sample, the adhesive strength it exhibited after exposure to heat under pressure and residual adhesives were measured or evaluated. The results are shown in Table 2.

Example 11

A surface protective film was prepared as in Example 9 except that the surface forming base layer 10 μm thick was composed of 50 parts by weight of high-density (0.95 g/cm³) polyethylene and 50 parts by weight of a Zn ionically crosslinked resin of an ethylene-(meth)acrylic acid copolymer (HIMILAN 1605 of Mitsui Petrochemical Industries, Ltd. ) The ease of film making, the film rewinding force, the initial tack of the film sample, the adhesive strength it exhibited after exposure to heat under pressure and residual adhesives were measured or evaluated. The results are shown in Table 2.

Example 12

A surface protective film was prepared as in Example 9 except that the surface forming base layer 10 μm thick was solely compound of high-density (0.95 g/cm³) polyethylene. The ease of film making, the film rewinding force, the initial tack of the film sample, the adhesive strength it exhibited after exposure to heat under pressure and residual adhesives were measured or evaluated. The results are show in Table 2.

Example 13

A surface protective film was prepared as In Example 9 except that the surface forming base layer 10 μm thick was solely composed of 80 parts by weight of high-density (0.95 g/cm³) polyethylene and 20 parts by weight of low-density (0.92 g/cm³) polyethylene. The ease of film making, the film rewinding force, the initial tack, the adhesive strength it exhibited after exposure to heat under pressure and the residual adhesives were measured or evaluated. The results shown in Table 2.

Example 14

A surface protective film was prepared as in Example 9 except that the surface forming base layer 10 μm thick was composed of 70 parts by weight of high-density (0.95 g/cm³) polyethylene and 30 parts by weight of low-density (0.92 g/cm) polyethylene. The ease of film making, the film rewinding force, the initial tack, the adhesive strength it exhibited after exposure to heat under pressure and the residual adhesives were measured or evaluated. The results are shown in Table 2.

valuable use in a wide range of applications including facing polywoods, glass plates and synthetic resin boards.

What is claimed is:

1. A surface protective film comprising:
   (1) a base layer consisting of one or more sublayers; and
   (2) an adhesive layer disposed on an underside of said base layer, comprising an α-olefin copolymer of at least two α-olefins selected from among α-olefins having 3–12 carbon atoms, and having a crystallinity of up to 10%;
   wherein said adhesive layer develops an initial tack of at least 20 g/25 mm when said surface protective film is attached to the surface of a stainless steel plate at 23° C., and exhibits an adhesive strength of no more than 1,000 g/25mm after a period of time of heating under pressure.

2. A surface protective film comprising:
   (1) a base layer consisting of one or more sublayers, which sublayers comprise at least a first sublayer on an underside of said base layer, comprising a polymer comprising an α-olefin having 2–12 carbon atoms; and
   (2) an adhesive layer disposed on said underside of said base layer, and in contact with said first sublayer, comprising an α-olefin copolymer of at least two α-olefins selected from among α-olefins having 3–12 carbon atoms, and having a crystallinity of up to 10%;
   wherein said adhesive layer develops an initial tack of at least 20 g/25 mm when said surface protective film is attached to the surface of a stainless steel plate at 23° C., and exhibits an adhesive strength of no more than 1,000 g/25 mm after a period of time of heating under pressure.

TABLE 2

| | Unit or criterion | Examples | | | | | | | |
|---|---|---|---|---|---|---|---|---|---|
| | | 7 | 8 | 9 | 10 | 11 | 12 | 13 | 14 |
| Ease of film making | | good | good | good | good | good | good | good | good |
| Film rewinding force | g/25 mm | 100 | 200 | 120 | 100 | 120 | 200 | 170 | 150 |
| Adhesive characteristics initial tack | g/25 mm | 90 | 320 | 180 | 180 | 180 | 180 | 180 | 180 |
| adhesive strength after heating at pressure | g/25 mm | 200 | 450 | 300 | 300 | 300 | 300 | 300 | 300 |
| residical adhesives after heating at pressure | positive/negative | negative | negative | negative | negative | negative | negative | negative | negative |

As demonstrated on the foregoing pages, the surface protective film of the present invention develops satisfactory initial tack at room temperature, will experience only small changes in adhesive strength (peel strength) with the lapse of time after attachment to adherends, is sufficiently low in blocking force to provide ease in film handling during the rewinding operation and it yet can be manufactured at low cost. For example, the film may be heated at 60° C. and 2 kg/cm² for 10 days and yet it can be stripped with a force of no more than 1 kg/25 mm without breakage or without any portion of the adhesive being left on the surface of an adherend such as a stainless steel plate. Thus, the surface protective film of the present invention has the advantage that it can be attached to various metal plates such as aluminum, steel and stainless steel plates, as well as coated plates of the same species and that the assemblies are amenable to various kinds of working. Therefore, the film is particularly suitable for use as a material to protect the surfaces of those metal and coated plates. The film also finds 3. The surface protective film according to any one of claims 1–2, wherein said adhesive layer comprises an α-olefin copolymer consisting of propylene, 1-butene and an α-olefin having 5–12 carbon atoms.

4. The surface protective film according to claim 3, wherein said propylene is present in an amount of 10–85 mol %, said 1-butene is present in an amount of 3–60 mol %, and said α-olefin having 5–12 carbon atoms is present in an amount of 10–85 mol %.

5. The surface protective film according to claim 3, wherein said α-olefin having 5–12 carbon atoms is 4-methyl-1pentene.

6. The surface protective film according to any one of claims 1–2, wherein an outermost of said sublayers of said base layer comprises a mixture of said polymer of an α-olefin having 2–12 carbon atoms and a metal ionically crosslinked resin of an ethylene-(meth)acrylic acid copolymer.

7. The surface protective film according to any one of claims 1–2, wherein said adhesive layer comprises an α-olefin copolymer consisting of propylene, 1-butene, an α-olefin having 5–12 carbon atoms, and at least one component selected from the group consisting of:

(A) a copolymer of at least two monomers selected from the group consisting of ethylene, propylene and 1-butene;

(B) a cooligomer of ethylene and an α-olefin; and (C) an optionally hydrogenated styrene-diene based copolymer.

8. The surface protective film according to any one of claims 1–2, wherein said adhesive layer comprises an α-olefin copolymer consisting of propylene, 1-butene and an α-olefin having 5–12 carbon atoms, and at least one component selected from the group consisting of:

(B) a cooligomer of ethylene and an α-olefin;

(D) a styrene-ethylene-butylene-styrene block copolymer; and (E) a styrene-isoprene-styrene block copolymer.

9. The surface protective film according to claim 1, wherein said base layer and said adhesive layer are formed simultaneously by melt co-extrusion.

10. The surface protective film according to claim 1, wherein the base layer has two or more sublayers.

11. The surface protective film according to claim 10, wherein a sublayer in contact with the adhesive layer contains a polymer comprising an α-olefin having 2–12 carbon atoms.

12. The surface protective film according to claim 11, wherein the content of the polymer comprising α-olefin in contact with the adhesive layer is about 70–100wt %.

13. The surface protective film according to claim 6, wherein the proportion of α-olefin containing polymer to metal ionically crosslinked resin is 90/10–50/50 by weight ratio.

14. The surface protective film according to claim 13, wherein the content of the mixture in said outermost sublayer comprises 50–100wt % of said mixture.

15. The surface protective film according to claim 4, wherein said propylene is present in an amount of 15–70mol %, said 1-butene is present in an amount of 5–50mol %, and said α-olefin having 5–12 carbon atoms is present in an amount of 15–70mol %.

16. A surface protective film comprising:

(1) a base layer consisting of one or more sublayers; and (2) an adhesive layer disposed on an underside of said base layer, comprising an α-olefin copolymer consisting essentially of two α-olefins selected from among α-olefins having 3–12 carbon atoms, and having a crystallinity of up to 10%;

wherein said adhesive layer develops an initial tack of at least 20 g/25 mm when said surface protective film is attached to the surface of a stainless steel plate at 23° C., and exhibits an adhesive strength of no more than 1,000 g/25 mm after a period of time of heating under pressure.

17. A surface protective film comprising:

(1) a base layer consisting of one or more sublayers, which sublayers comprise at least a first sublayer on an underside of said base layer, comprising a polymer comprising an α-olefin having 2–12 carbon atoms; and (2) an adhesive layer disposed on said underside of said base layer, and in contact with said first sublayer, comprising an α-olefin copolymer consisting essentially of two α-olefins selected from among α-olefins having 3–12 carbon atoms, and having a crystallinity of up to 10%;

wherein said adhesive layer develops an initial tack of at least 20 g/25 mm when said surface protective film is attached to the surface of a stainless steel plate at 23° C., and exhibits an adhesive strength of no more than 1,000 g/25 mm after a period of time of heating under pressure.

* * * * *